United States Patent [19]

Hanaoka

[11] Patent Number: 5,590,249
[45] Date of Patent: Dec. 31, 1996

[54] THREE DIMENSIONAL SPRITE RENDERING APPARATUS AND METHOD

[75] Inventor: Toshiharu Hanaoka, Chiba, Japan

[73] Assignee: Sharp Kabushiki Kaisha, Osaka, Japan

[21] Appl. No.: 414,234

[22] Filed: Mar. 31, 1995

[30] Foreign Application Priority Data

Apr. 1, 1994 [JP] Japan .................................. 6-064279

[51] Int. Cl.[6] .................................................. G06T 15/40
[52] U.S. Cl. ........................................ 395/122; 395/124
[58] Field of Search .................................... 395/119, 120, 395/121, 122, 124

[56] References Cited

U.S. PATENT DOCUMENTS

| 4,951,038 | 8/1990 | Yamamura | 345/122 |
|---|---|---|---|
| 5,101,475 | 3/1992 | Kaufman et al. | 395/124 |
| 5,357,604 | 10/1994 | San et al. | 395/162 |

FOREIGN PATENT DOCUMENTS

| 63-284593 | 11/1988 | Japan . |
|---|---|---|
| 3-233685 | 10/1991 | Japan . |
| 5-249953 | 9/1993 | Japan . |
| 5-249953 | 9/1993 | Japan . |
| 5-333850 | 12/1993 | Japan . |

OTHER PUBLICATIONS

Foley et al, "Computer Graphics: Principles and Practice, Second Edition", 1991, pp. 229–242, 471–477, 549, 668, and 754–758.

"Game Consoles Companies Should Rethink Approach to Storage Strategy", Guardian, p. 31, Oct. 1, 1992.

*Primary Examiner*—Mark K. Zimmerman

[57] ABSTRACT

A three dimensional sprite rendering apparatus for producing three dimensional graphic images includes a three dimensional graphic circuit for producing backgrounds of three dimensional graphics and outputting pixel data for each pixel of the backgrounds, and a first buffer storing depth data for each pixel of the backgrounds. The apparatus further includes a voxel character control register for storing control data for voxel characters, a voxel character memory storing geometric data for voxel characters, a volume rendering circuit connected to the voxel character control register and the voxel character memory for producing graphics of voxel characters and outputting pixel data for each pixel of the voxel characters, and a second buffer storing depth data for each pixel of the voxel characters. A depth comparator is connected to the first and second buffers for comparing the depth of a three dimensional background graphic with the depth of a voxel character graphic and generating a control signal according to a result of comparison. An image generation circuit receives the pixel data of backgrounds and the pixel data of voxel characters as well as the control signal, and synthesizes two pixel data inputs according to the control signal.

24 Claims, 7 Drawing Sheets

FIG. 12a
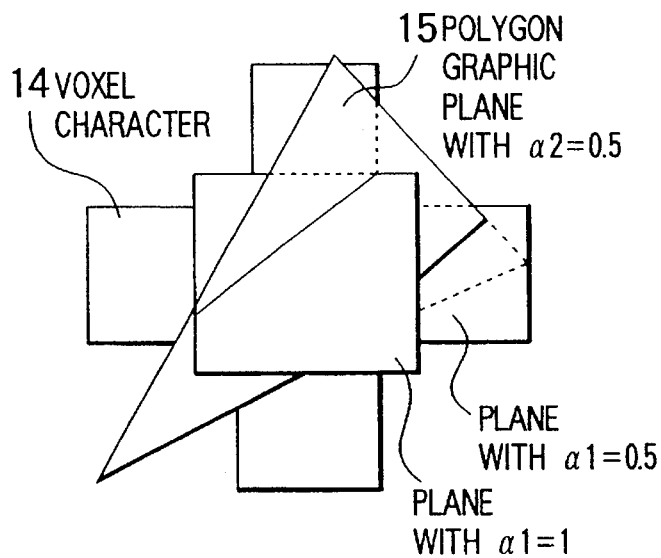
FIG. 12b
| 0 | 0 | 0 | 0 | 0 | 0 | e | 0 | 0 | 0 | 0 | 0 |
|---|---|---|---|---|---|---|---|---|---|---|---|
| 0 | 0 | 0 | 0 | 0 | c | e | f | g | 0 | 0 | 0 |
| 0 | 0 | 0 | 0 | 0 | c | f | g | h | i | 0 | 0 |
| 0 | 0 | 0 | 0 | 0 | f | g | h | i | j | k | 0 |
| 0 | 0 | 0 | 0 | a | g | h | i | a | a | l | m |
| b | b | b | b | g | h | i | a | a | a | m | n | p | b |
| b | b | b | b | h | i | a | a | a | a | n | p | b | b |
| b | b | b | h | i | a | a | a | a | a | p | b | b | b |
| b | b | b | i | a | a | a | a | a | a | b | b | b | b |
| 0 | 0 | i | j | a | a | a | a | a | 0 | 0 | 0 | 0 |
| 0 | 0 | j | k | l | m | n | b | b | 0 | 0 | 0 | 0 |
| 0 | j | k | l | m | b | b | b | b | 0 | 0 | 0 | 0 |
| 0 | k | l | 0 | 0 | b | b | b | b | 0 | 0 | 0 | 0 |
| k | 0 | 0 | 0 | 0 | b | b | b | 0 | 0 | 0 | 0 |
FIG. 13
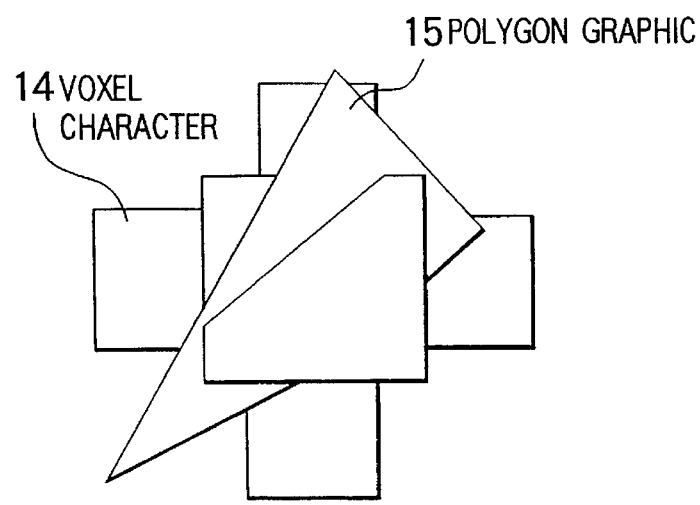

THREE DIMENSIONAL SPRITE RENDERING APPARATUS AND METHOD

BACKGROUND OF THE INVENTION

1. Field of the Invention

The present invention relates to a three dimensional sprite rendering apparatus, in particular, to a three dimensional sprite rendering apparatus that determines the depth of each dot in a three dimensional graphic, operates independently of other graphic production means, and enables the movement, rotation, and enlargement of a graphic in any three dimensional direction without manipulating other graphics by operating a control register.

2. Description of the Related Art

Two dimensional graphics displaying apparatuses such as video game machines have a function called a sprite that enables the details of graphics to be expressed and moved at a high speed. For example, Japanese Patent Application Laying Open 63-284593 entitled "Sprite Display Control Device for Scanning Display Device" can move sprites within a display screen to smoothly move characters on the screen simply by changing coordinate values in a sprite attribute table that defines the location and type of patterns without the need to redefine the patterns.

The screen of a two dimensional graphic video game machine has a background (simply referred to as "BG" below) that is a graphic function used as a background for graphics; and a sprite (simply referred, to as "SP" below) that can display a small graphic bustling about on the screen. A BG is used for an image that does not substantially move, and a video game is created by placing SPs on the BG in arbitrary locations. SPs capable of bustling about within the screen are often used to create characters in a video game. In addition, an animation effect can be produced by alternatively displaying different SPs for a character.

A three dimensional video game machine comprises BGs, SPs, and three dimensional graphics (simply referred to as "PG") subjected to depth processing. Three dimensional graphics are, For example, graphics using polygons and subjected to hidden surface processing such as a Z buffer method. Since the BG is displayed as an image at a single depth or an image that does not contain polygons, it is not subjected to mathematical operations concerning the depth. Both SPs and PGs are, however, displayed at similar depths. This is true when the leading characters in a game are moving within a three dimensional space comprising polygons. In this case, since current video game machines do not provide SPs with information on depth, SPs are always located in front of a PG or hidden in rear of a PG. The principle advantage of SPs is that they enable the leading characters in a video game to freely move against a background. Current video game machines thus include a rotation/enlargement/reduction function to create various states of SPs.

SPs do not perfectly meet the needs of three dimensional graphics involving depth. This is because hidden surface processing associated with both SPs and PGs is not provided although both SPs and PGs are displayed at similar depths. When a leading character in a game is moving through a three dimensional space comprising polygons, current graphic systems must determine whether an SP should be located in front or rear of a PG using mathematical operations in a program, in order to display the SP in front or rear of the PG. This does not perfectly meet the needs, however, because the depth relationship between the SPs and PG must be processed for each dot because the PG has a depth for each of their dots.

The main advantage of SPs is that they enable the leading character in a video game to freely move against a background without the need of positional determination by a program. In three dimensional video games, however, SPs cannot move freely in the direction of depth because such video games use as a background a PG comprising a three dimensional space instead of a BG that is a two dimensional space (hidden surface processing is not provided). Even if the depth relationship is processed for each dot, SPs still fail to meet the needs of three dimensions in that they do not express the thickness of objects. This is because SPs can be rotated in the direction of the Z axis whereas they cannot be rotated in the X or the Y axis.

The rotation in the X and the Y directions is possible if data for the rotation in the X and the Y directions is used to rewrite display data for SPs. This processing takes, however, a large amount of time to rewrite display data in a three dimensional graphic system wherein the viewpoint is constantly changed. It is also possible to use SPs corresponding to data for the rotation to rotate displayed SPs by switching control data.

In this case, however, a large number of SPs must be used, and a large number of characters cannot be used because a single character requires a large number of SPs due to physical limitations of hardware. In both cases, a large data area is required to save data.

The problems of the prior art can be summarized as follows:

(1) The prior art does not provide hidden surface processing for the depth of each dot.

(2) Due to the lack of data for expressing the thickness of objects, the prior art cannot carry out three dimensional rotation properly. Even if it can carry it out, the volume of data increases.

SUMMARY OF THE INVENTION

It is an object of this invention to provide a three dimensional rendering apparatus that uses voxel characters to implement hidden surface processing for a BG and each dot and employs the three dimensional structure of voxel characters to display a single voxel character from different viewpoints, thereby rotating the voxel character as if it was actually in a three dimensional space.

The above object of this invention is achieved by a three dimensional sprite rendering apparatus for producing three dimensional graphic images, having a three dimensional graphic circuit for producing backgrounds; a Z buffer for hidden surface processing for backgrounds; a volume rendering circuit for producing voxel character graphics; a voxel character control register for storing control data for voxel characters; a voxel character RAM for storing geometric data for voxel characters; a Z value operation device for calculating the depth of each pixel in voxel characters; a Z value comparator for determining the depth of a three dimensional background graphic and the depth of a voxel character graphic; and an image synthesis circuit for synthesizing two pixel data inputs according to a control signal to output the synthesized image or an image switching circuit for selecting one of the inputs to output it.

In the above configuration, the pixel value of a voxel graphic or the pixel value of a three dimensional graphic is selected or the two pixel values are synthesized according to the Z value of the voxel graphic and the size of the Z buffer for the three dimensional circuit. This enables hidden surface processing for each dot, and the use of voxel graphics for production of SP images further allows three dimensional SPs with a thickness to be produced.

Further objects and advantages of the present invention will be apparent from the following description of the preferred embodiments of the invention as illustrated in the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12a and 12b show an example of output from an image synthesis circuit; and FIG. 13 shows an example of output from an image switching circuit.

DESCRIPTION OF THE PREFERRED EMBODIMENTS

Embodiments of this invention are described below with reference to the drawings.

Figure 1:
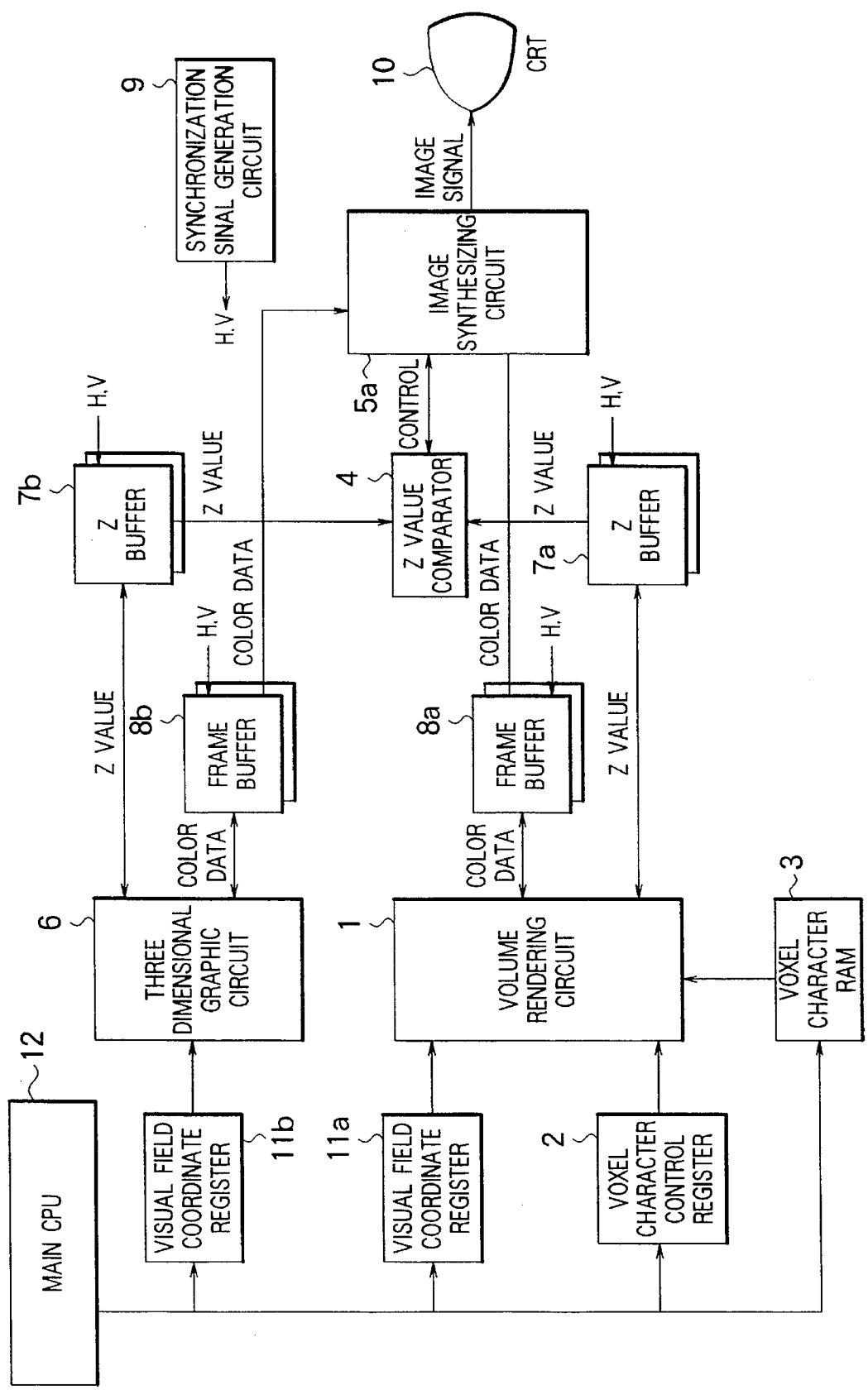
FIG. 1 is a block diagram for describing an embodiment of a three dimensional sprite rendering apparatus according to this invention.

FIG. 1 is a block diagram for describing an embodiment of a three dimensional sprite rendering apparatus according to this invention. FIG. 1 includes a volume rendering circuit 1, a voxel character control register 2, a voxel character random access memory (RAM) 3, a Z value comparator 4, an image synthesis circuit 5a, a three dimensional graphic circuit 6, Z buffers 7a and 7b, frame buffers 8a and 8b, a synchronization signal generation circuit 9, a cathode ray tube (CRT) 10, visual field coordinate registers 11a and 11b, and a main central processing unit (CPU) 12.

The three dimensional graphic circuit 6 is, for example, a polygon graphic circuit that uses a Z buffer to produce graphics with a depth which are subjected to hidden surface processing. The Z buffer 7b is used as a data region for the three dimensional graphic circuit 6 to store depth data for each pixel. Although this buffer is called a Z buffer due to the use of a Z buffer method, it may comprise any storage that stores depth data or processed depth data for each pixel.

The volume rendering circuit 1 uses a conventional volume rendering technique to produce two dimensional images as viewed by a viewpoint based on solid data comprising three dimensional cubes. The volume rendering technique is already known, so it is not explained here. Some voxel graphic production methods, that is, volume rendering methods, use a Z buffer method. In this case, Z values used in the volume rendering circuit 1 are used for voxel characters. The Z buffer 7a temporarily stores these values.

In this embodiment, the frame buffer 8a, 8b and the Z buffer 7a, 7b are used to synchronize the output of the three dimensional graphic circuit 6 and the output of the volume rendering circuit 1. In general, these circuits do not attempt to synchronize with each other and it is also difficult for them to execute synchronization. Synchronization signals also used for image output can be conveniently used for this synchronization; image synchronization signals H, V from the image signal generation circuit 9 are often used. The Z value comparator 4 receives the Z values of both a three dimensional graphic and a voxel character from the Z buffer to compare them and then sends a control signal to the image synthesis circuit 5a according to the comparison. The image synthesis circuit 5a receives the control signal output from the Z value comparator 4 and color data for both three dimensional graphic and voxel character to perform color synthesis based on their depth relationship and the α value.

The visual field registers 11a, 11b provide viewpoint coordinates and visual field vectors to the three dimensional graphic circuit 6 and the volume rendering circuit 1. These values changes the viewpoint for images produced in the respective circuits. The same values are usually set in both registers 11a, 11b. This is because strange images are produced if the viewpoint for three dimensional graphics does not match the viewpoint for volume rendering. Such strange images can, however, be used to produce some image effect, so the separate registers are provided to enable different viewpoints to be set. The main CPU 12 sets data for the visual field register 11a, 11b, the voxel character control register 2, and the voxel character RAM 3. The main CPU 12 also controls the three dimensional graphic circuit 6, the volume rendering circuit 1 and sets data for them. This is not, however, an integral part of this invention, so further description is omitted.

Figure 2:
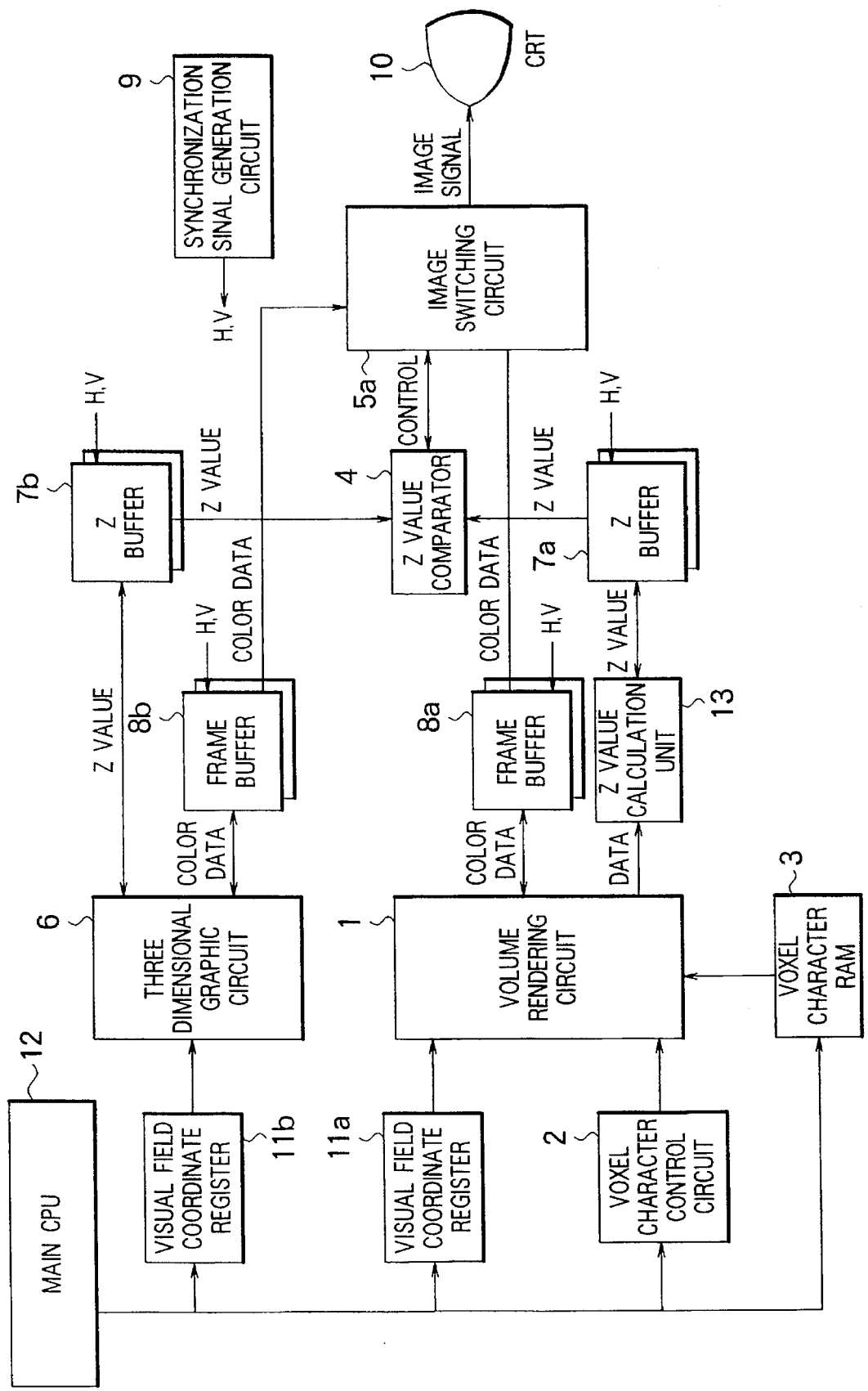
FIG. 2 shows another embodiment of a three dimensional sprite rendering apparatus according to this invention.

FIG. 2 shows another embodiment of a three dimensional sprite rendering apparatus according to this invention. In this figure, reference numerals 5b and 13 designate an image switching circuit and a Z value calculation unit, respectively, and the other components having the same functions as the corresponding components in FIG. 1 carry the same reference numerals as those components.

If the volume rendering method does not use a Z buffer method, as shown in FIG. 2, the Z value calculation unit 13 must be provided to calculate the Z value (the same as that of the Z buffer) of each pixel of a voxel character produced by the volume rendering circuit 1.

Figure 3:
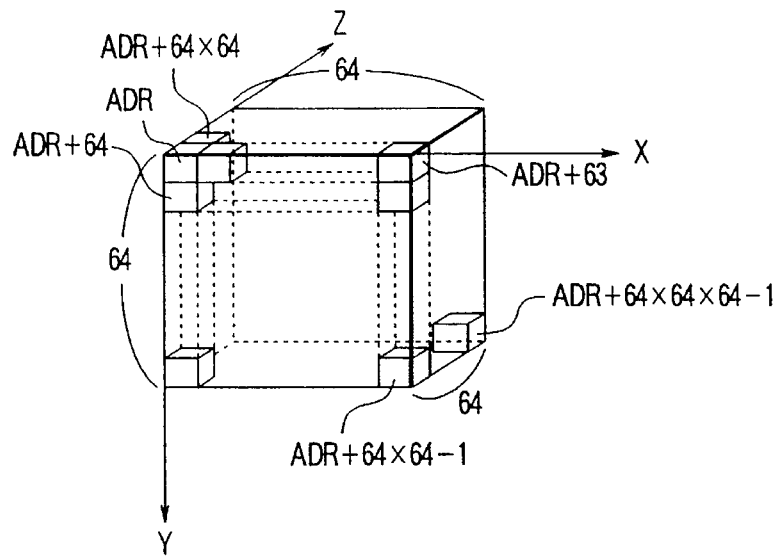
FIG. 3 shows an example of the configuration of a voxel character according to this invention.
Figure 4:
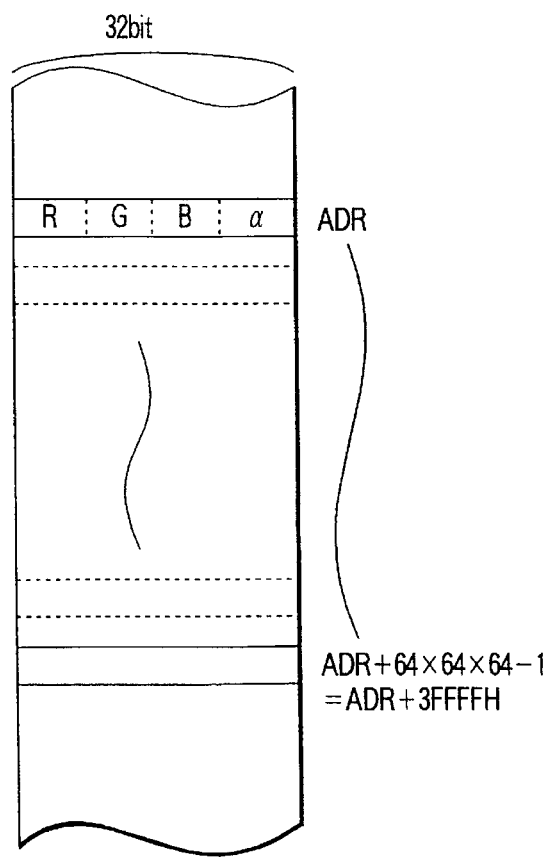
FIG. 4 shows an example of the configuration of a voxel character RAM according to this invention.
Figure 5:
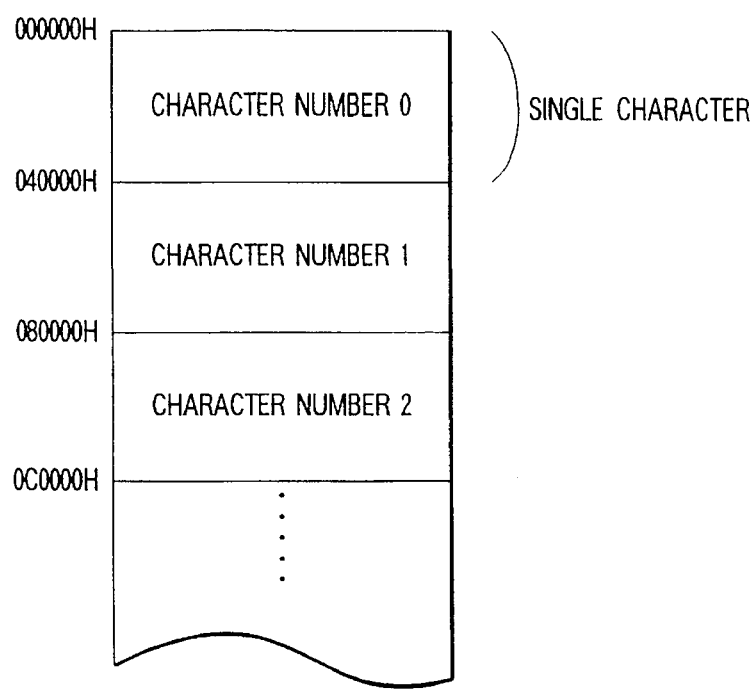
FIG. 5 shows the relationship between the character number and the address of a voxel character according to this invention.

FIGS. 3 to 5 show an example of the data structure of a voxel character.

A voxel character is represented by a collection of unit cubes that are called voxels.

In FIG. 3, a voxel character comprises 262, 144 voxels (64 ×64×64). Voxel character data is stored in the voxel character RAM 3.

FIG. 4 shows an example of storage addresses on the voxel character RAM.

The voxel information at (0,0,0) in FIG. 3 is assigned to address ADR in the voxel character RAM 3, and the voxel information at (1,0,0) is assigned to address ADR+1. In this manner, voxel information is sequentially assigned to the corresponding address in the voxel character RAM according to incrementation in the X, the Y, and the Z directions in this order. A word width for a single address equals the size of the corresponding voxel information. In this example, the word width is 32 bits comprising 8 bits for each color information R, G, B and 8 bits for transparency α.

Since a single piece of voxel character data comprises 262, 144×32 bits, a single character occupies 262, 144 (40000H in the hexadecimal expression.) addresses in the voxel RAM. The voxel character RAM 3 stores a plurality of voxel characters, and character numbers are defined to identify them.

FIG. 5 shows an example of the definition of character numbers.

In this example, numbers 0, 1, 2 . . . are sequentially assigned to the respective voxel characters starting with address 0 in the voxel character RAM 3.

The voxel character control register 2 stores the numbers representing the displayed characters, location coordinates (X, Y, Z), rotation values (θx, θy, θz) and enlargement values (Lx, Ly, Lz). Changing this data in the control register enables voxel characters to be displayed in arbitrary locations.

Figure 6:
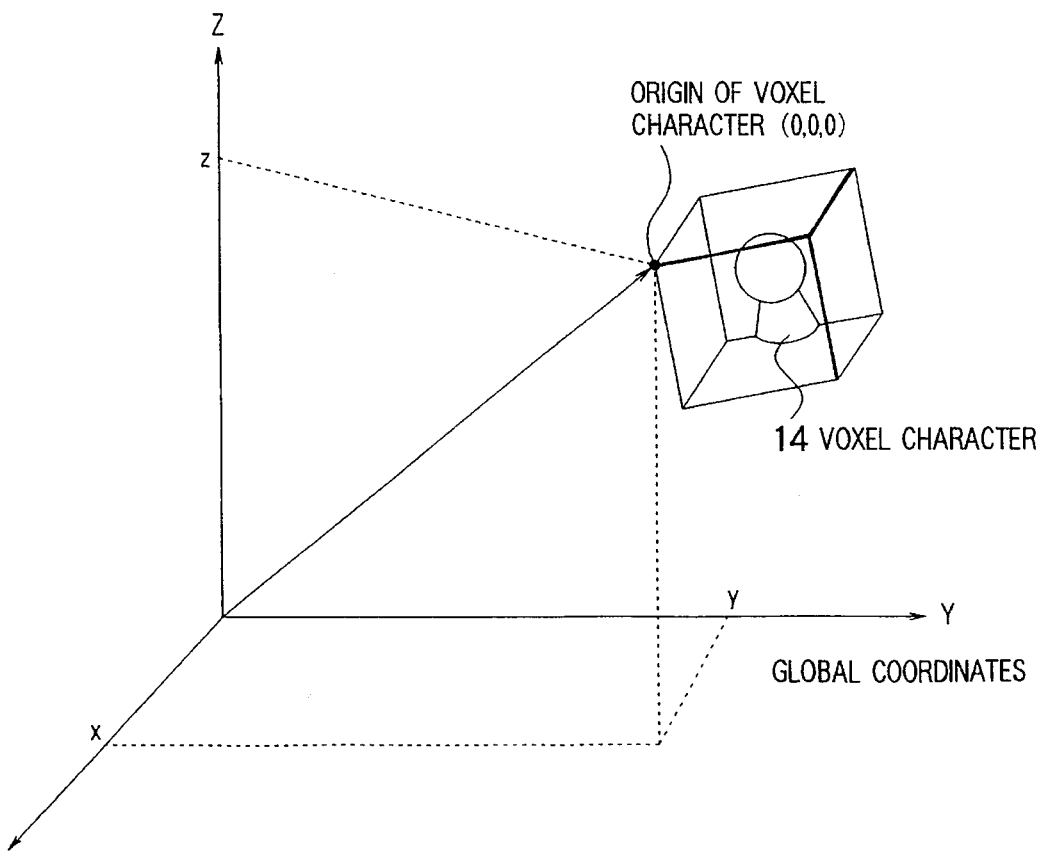
FIG. 6 shows an example of voxel character control data (location coordinate data) according to this invention.
Figure 7:
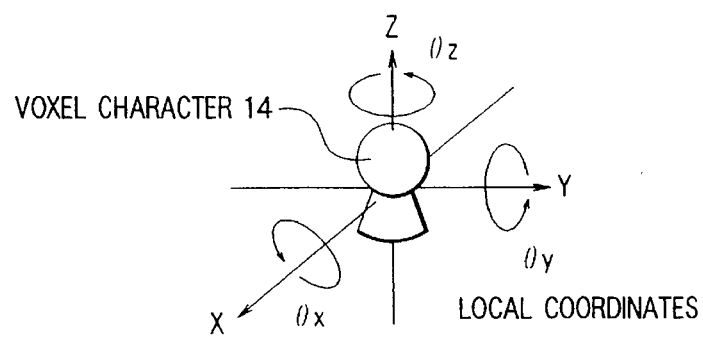
FIG. 7 shows an example of voxel character control data (rotation value data) according to this invention.
Figure 8:
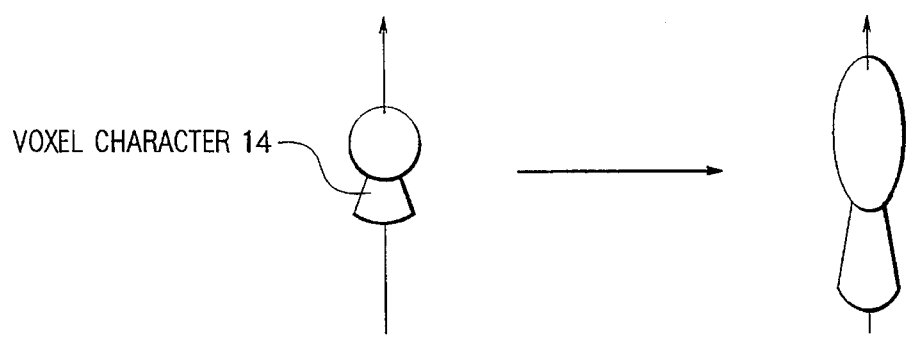
FIG. 8 shows an example of voxel character control data (enlargement value data) according to this invention.

FIGS. 6 to 8a, 8b show an example of voxel character control data. FIGS. 6, 7, and 8a, b show location coordinate data, rotation value data, and enlargement value data, respectively. In these figures, reference numeral 14 designates a voxel character.

Location coordinates determine where a voxel character 14 should be located in the global coordinate system, rotation values determine to what degree the voxel character should be rotated relative to the local coordinate axes, and enlargement values determine to what degree the voxel character should be enlarged in the direction of each of the local coordinate axes.

The three dimensional graphic circuit 6 reads visual field coordinates and viewpoint vectors from the visual field register, and performs various processing to produce in the frame buffer 8b graphics subjected to hidden surface processing.

Figures 9A, 9B:
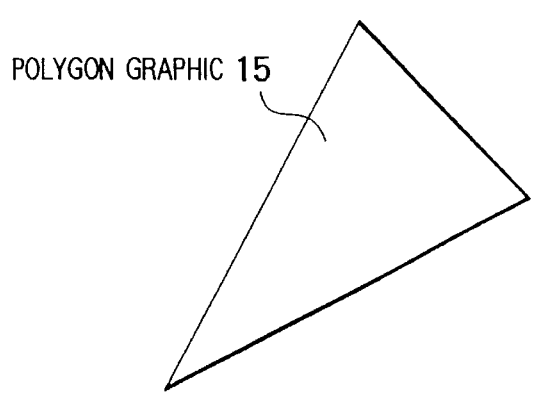
FIGS. 9a and 9b show an example of output from a three dimensional graphic circuit according to this invention.

FIGS. 9a, b show an example of output from the three dimensional graphic circuit. FIG. 9a shows a frame buffer output and FIG. 9b shows a Z buffer output, respectively. In the figures, reference numeral 15 designates a polygon graphic.

If, for example, the three dimensional graphic circuit 6 handles a polygon graphic, it outputs to the frame buffer 8b a polygon graphic 15 as shown in FIG. 9a. At this time, the Z buffer is as shown in FIG. 9b. Value 0 in the Z buffer indicates that the frame buffer 8b does not contain image data in the corresponding location, and a BG is synthesized therein. The values (e) to (r) in the Z buffer shown in FIG. 9b provisionally represent 16 bit values representing depth. Value (e) represents the smallest depth, that is, being closest to the user, (f) represents the second smallest depth, and value (r) represents the largest depth. A polygon graphic is usually displayed by using a plurality of polygons as shown in the figure, and the contents of the frame buffer 8b and the Z buffer 7b are complicated. For simplification, however, only the part of the contents are shown.

The volume rendering circuit 1 reads the location coordinates of a voxel character, and rotation and enlargement values from the voxel character control register 2, and voxel character data from the voxel character RAM 3. It then uses the volume rendering technique to produce an image as seen from the viewpoint. The volume rendering technique is already known, so the description is omitted.

Figure 10:
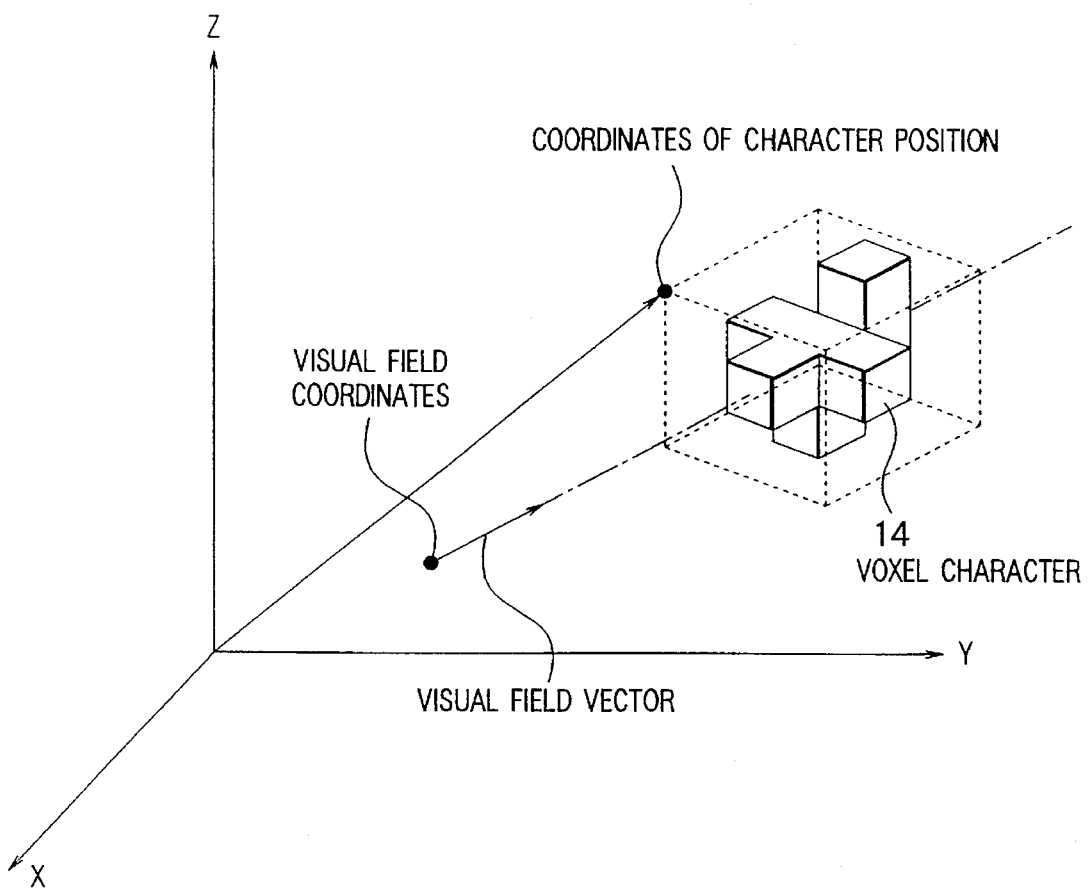
FIG. 10 shows an example of a voxel character according to this invention (location in a global coordinate system)
Figures 11A, 11B:
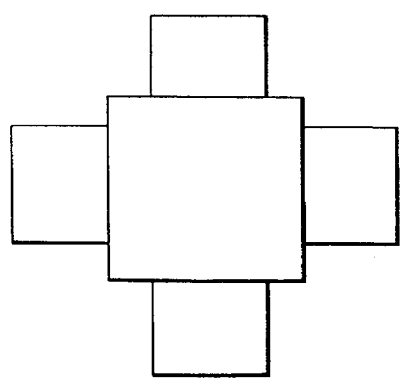
FIGS. 11a and 11b show an example of a voxel character according to this invention (output of a volume rendering circuit)

FIGS. 10 and 11a, b show an example of a voxel character. FIG. 10 shows the location of the voxel character in the global coordinate system and FIGS. 11a and 11b show output from the volume rendering circuit. Specifically, FIG. 11a shows a frame buffer output, and FIG. 11b shows a Z buffer output.

The frame buffer output is an image showing a voxel character as seen from the viewpoint, as shown in FIGS. 10, 11. FIG. 11b shows a corresponding Z buffer output. The values (a) to (c) in the Z buffer shown in FIG. 11b provisionally represent 16 bits values representing depth. That is, they are Z values representing the magnitude of depth wherein value (a) represents the smallest depth whereas value (c) represents the largest depth. For simplification, the viewpoint vector is located perpendicular to the voxel character in FIGS. 10, 11. Volume rendering enables images to be produced in every direction.

The Z value comparator 4 and the image synthesis circuit 5a combine color data stored in the frame buffers 8a, 8b in FIGS. 9a and 11a according to the contents of the Z buffers 7a, 7b in FIGS. 9a and 11b. Values from the frame buffers 8a, 8b and the Z buffers 7a, 7b, corresponding to individual pixels are input to the image synthesis circuit 5a and the Z value comparator 4, respectively, in synchronization with signals H and V generated by the synchronization signal generation circuit 9.

A general image production circuit is provided with two frame buffers 8a, 8b and two Z buffers 7a, 7b. While the three dimensional graphic circuit 6 is executing a write to one of the frame or the Z buffer, the other carries out image output.

The system shown in FIG. 1 has a similar configuration. That is, while the three dimensional graphical circuit 6 is outputting data to one frame buffer 8b, required data is obtained from the other frame buffer 8a in synchronization with a synchronization generation signal.

The Z value comparator 4 compares two values from the Z buffers 7a, 7b. For example, the comparator compares two 16-bit values, and outputs a control signal "H" if the depth value from the three dimensional graphic circuit 6 is larger, that is, that three dimensional graphic is located below another, and to otherwise output a control signal "L". The image synthesis circuit 5a receives this control signal to calculate an image signal. Equations for color C for an image signal to be output is as follows when an RGB value and an a value from the frame buffer 8a and an RGB value and an a value from the frame buffer 8b are C1, α1, C2, and α2, respectively.

(1) For control signal "H":
Since the voxel character is located above, $$C = C1 \times \alpha1 + C2 \times (1-\alpha1)$$

(2) For control signal "L":
Since the three dimensional graphic is located above, $$C = C2 \times \alpha2 + C1 \times (1-\alpha2)$$

α represents transparency, and indicates to what degree a pixel transmits the color of another pixel located below. α=1 means opaqueness while $\alpha=0$ means complete transparency. For the values between 1 and 0, processing is performed so as to allow the pixel located below to be seen through the pixel located above.

FIGS. 12a, b show image synthesis output that is the results of all the pixel signals in FIGS. 9a, b and 11a, b passing through the Z value comparator 4 and the image synthesis circuit 5a. FIGS. 12a, b show image output and an example of processing by the Z buffer, respectively. In this case, the depth is as follows.

a>e, f, g, h, i
a<j, k, l, m, n, p
b>e, f, g, h, i, j, k, l, m, n, p
b<q, r
c>e, f, g, h, i, j, k, l, m, n, p, q, r

The example of processing by the Z buffer shown in FIG. 12b shows the results for the smaller depth of the values from the Z buffer in FIG. 11b and from the Z buffer in FIG. 9b which are compared. For example, for the pixel in row 2 and column 7 in FIG. 12b, processing is performed as follows.

Value (c) in row 2 and column 7 in the Z buffer 7a in FIG. 11b and value (e) in row 2 and column 7 in the Z buffer 7b in FIG. 9b are input to the Z comparator 4. Since c>e, the output of the Z comparator 4 is "L", and the image synthesis circuit 5a performs processing required for the above case (1) in which the three dimensional graphic is located above. That is, the value of $\alpha 2$ generates an image signal causing the voxel character located below the three dimensional graphic to be seen through the this graphic.

For the pixel in row 9 and column 5 in FIG. 12 (b), processing is performed as follows.

Value (a) in row 9 and column 5 in the Z buffer 7a in FIG. 11b and value (j) in row 9 and column 5 in the Z buffer 7b in FIG. 9b are input to the Z comparator 4. Since a<j, the output of the Z comparator 4 is "H", and the image synthesis circuit 5a performs processing required for the above case in which the voxel character is located shallower. That is, the value of $\alpha 1$ generates an image signal causing the three dimensional graphic located below the voxel character to be seen through this character.

As described above, FIG. 2 shows another example of a three dimensional sprite rendering apparatus according to this invention. In this figure, the Z value calculation unit 13 is added to the FIG. 1, and the image synthesis circuit 5a is replaced by the image switching circuit 5b.

Although the embodiment shown in FIG. 1 includes an image synthesis circuit capable of transparent hidden surface processing using value $\alpha$, the image switching circuit 5b that determines whether the output of the frame buffer 8a or the output of the frame buffer 8b should be selected may be provided, as in the embodiment shown in FIG. 2. In this case, however, an image hidden behind another image cannot be seen at all in the output of the image switching circuit, as shown in FIG. 13.

The complete circuit configuration enables a three dimensional graphic and a voxel character to be synthesized, thereby enabling voxel characters to be manipulated as if they were in a three dimensional space.

As described above, the graphic system according to this invention is characterized in that it includes the three dimensional graphic circuit 6 for producing backgrounds; the Z buffer 7b for hidden surface processing for backgrounds; the volume rendering circuit 1 for producing voxel character graphics; the Z value operation device 13 for calculating the depth of each pixel in voxel characters; the Z value comparator 4 for determining the depth of a three dimensional background graphic to the depth of a voxel character graphic; and the image switching circuit 5b for selecting one of two pixel data inputs according to a control signal or the image synthesis circuit 5a for synthesizing the two pixel data inputs according to a control signal to output it.

This configuration enables voxel graphics to be subjected to hidden surface processing and superposed on each other in an arbitrary location in a three dimensional graphic with depth. The Z value comparator 4 is used to solve problem (1), and voxel characters are used as three dimensional sprites to solve problem (2). Although methods for representing solid data voxels with voxels and volume rendering methods for rendering voxels into two dimensional images are publicly known, the technique for synthesizing voxels by subjecting polygon graphics to hidden surface processing is new. The technique for allowing voxels to act as SPs in two dimensional graphics to use them as three dimensional SPs is also new.

As is apparent from the above description, this invention uses voxel characters to implement hidden surface processing for a BG and each dot. In addition, voxel characters have a three dimensional structure, and a single voxel character can be displayed from different viewpoints. That is, voxel characters can be rotated as if they were actually in a three dimensional space. Voxel characters thus act as perfect three dimensional SPs. The use of the voxel character control register independently of the three dimensional graphic circuit enables a location in an image to be moved. That is, this invention enables SPs to operate independently of other graphic means, and also enables their display state to be changed by varying the value of the SP control register without changing graphics other than the SPs.

Many widely different embodiments of the present invention may be constructed without departing from the spirit and scope of the present invention. It should be understood that the present invention is not limited to the specific embodiments described in the specification, except as defined in the appended claims.

What is claimed is:

1. A three dimensional sprite rendering apparatus for producing three dimensional graphic images, comprising:

a three dimensional graphic circuit for producing backgrounds of three dimensional graphic and outputting pixel data for each pixel of said backgrounds;

a first buffer for storing depth data for each pixel of said backgrounds;

a voxel character control register for storing control data for voxel characters serving as sprites;

a voxel character memory for storing geometric data for voxel characters;

a volume rendering circuit connected to said voxel character control register and said voxel character memory for producing graphics of voxel characters and outputting pixel data for each pixel of said voxel characters;

a second buffer for storing depth data for each pixel of said voxel characters;

a depth comparator connected to said first and second buffers for comparing the depth of a three dimensional background graphic with the depth of a voxel character graphic and generating a control signal according to a result of comparison; and an image synthesis circuit connected to receive said pixel data of backgrounds and said pixel data of voxel characters as well as said control signal for synthesizing two pixel data inputs according to said control signal.

2. A three dimensional sprite rendering apparatus as claimed in claim 1, wherein said three dimensional graphic circuit is a polygon graphic circuit that uses said first buffer to produce graphics with a depth which are subjected to hidden surface processing.

3. A three dimensional sprite rendering apparatus as claimed in claim 1, wherein said volume rendering circuit produces two dimensional images as viewed from a view point based on solid data comprising three dimensional cubes.

4. A three dimensional sprite rendering apparatus as claimed in claim 1, said pixel data include color data.

5. A three dimensional sprite rendering apparatus as claimed in claim 1, wherein said apparatus further comprises visual field registers for providing viewpoint coordinates and visual field vectors to said three dimensional graphic circuit and said volume rendering circuit.

6. A three dimensional sprite rendering apparatus as claimed in claim 1, wherein said apparatus further comprises a Z value calculation unit for calculating the depth of each pixel of voxel characters.

7. A three dimensional sprite rendering apparatus as claimed in claim 1, wherein said voxel character memory stores a plurality of voxel characters, each composed of a plurality of voxels, voxel data for each voxel including data representative of color information and data representative of transparency, and character numbers being defined to identify respective voxel characters.

8. A three dimensional sprite rendering apparatus as claimed in claim 7, wherein said voxel character control register stores character numbers to be displayed, and location coordinates, rotation values, and enlargement values for displayed voxel characters.

9. A three dimensional sprite rendering apparatus as claimed in claim 1, wherein said control signal has two states and said depth comparator outputs a control signal with one state if the depth value from the three dimensional graphic circuit is larger than that from the volume rendering circuit and outputs said control signal with the other state if the depth value from the three dimensional graphic circuit in not larger than that from the volume rendering circuit.

10. A three dimensional sprite rendering apparatus as claimed in claim 9, wherein said image synthesis circuit outputs the image signal including color signal representative of color calculated by following equations:

$$C=C1\times\alpha1+C2\times(1-\alpha1) \text{ for control signal with said one state,}$$

$$C=C1\times\alpha2+C2\times(1-\alpha2) \text{ for control signal with said other state,}$$

wherein

C1, $\alpha1$ represents color value and transparency respectively in pixel data from the volume rendering circuit and C2, $\alpha2$ represents color value and transparency respectively in pixel data from the three dimensional graphic circuit.

11. A three dimensional sprite rendering apparatus as recited in claim 1, further comprising means for rotating said sprite in any one of three dimensions.

12. A three dimensional sprite rendering apparatus for producing three dimensional graphic images, comprising:

a three dimensional graphic circuit for producing backgrounds of three dimensional graphic and outputting pixel data for each pixel of said backgrounds;

a first buffer for storing depth data for each pixel of said backgrounds;

a voxel character control register for storing control data for voxel characters serving as sprites;

a voxel character memory for storing geometric data for voxel characters;

a volume rendering circuit connected to said voxel character control register and said voxel character RAM for producing graphics of voxel characters and outputting pixel data for each pixel of said voxel characters;

a second buffer for storing depth data for each pixel of said voxel characters;

a depth comparator connected to said first and second buffers for comparing the depth of a three dimensional background graphic with the depth of a voxel character graphic and generating a control signal accordingly a to a result of comparison; and an image switching circuit connected to receive said pixel data of backgrounds and said pixel data of voxel characters as well as said control signal for selecting one of received two pixel data according to said control signal, to output selected pixel data.

13. A three dimensional sprite rendering apparatus as claimed in claim 12, wherein said three dimensional graphic circuit is a polygon graphic circuit that uses said first buffer to produce graphics with a depth which are subjected to hidden surface processing.

14. A three dimensional sprite rendering apparatus as claimed in claim 12, wherein said volume rendering circuit produces two dimensional images as viewed from a viewpoint based on solid data comprising three dimensional cubes.

15. A three dimensional sprite rendering apparatus as claimed in claim 12, said pixel data include color data.

16. A three dimensional sprite rendering apparatus as claimed in claim 12, wherein said apparatus further comprises visual field registers for providing viewpoint coordinates and visual field vectors to said three dimensional graphic circuit and said volume rendering circuit.

17. A three dimensional sprite rendering apparatus as claimed in claim 12, wherein said apparatus further comprises a Z value calculation unit for calculating the depth of each pixel of voxel characters.

18. A three dimensional sprite rendering apparatus as claimed in claim 12, wherein said voxel character memory stores a plurality of voxel characters, each composed of a plurality of voxels, voxel data for each voxel including data representative of color information and data representative of transparency, and character numbers being defined to identify respective voxel characters.

19. A three dimensional sprite rendering apparatus as claimed in claim 18, wherein said voxel character control register stores character numbers to be displayed, and location coordinates, rotation values, and enlargement values for displayed voxel characters.

20. A three dimensional sprite rendering apparatus as claimed in claim 12, wherein said control signal has two states and said depth comparator outputs a control signal with one state if the depth value from the three dimensional graphic circuit is larger than that from the volume rendering circuit and outputs said control signal with the other state if the depth value from the three dimensional graphic circuit in not larger than that from the volume rendering circuit.

21. A three dimensional sprite rendering apparatus as claimed in claim 20, wherein said image switching circuit selects the pixel data from said volume rendering circuit for control signal with said one state, and selects the pixel data from said three dimensional graphic circuit.

22. A three dimensional sprite rendering apparatus as recited in claim 12, further comprising means for rotating said sprite in any one of three dimensions.

23. A method of rendering a three-dimensional sprite comprising the steps of:

produce a background and outputting data for each pixel of said background;

storing depth data for each pixel of said background;

storing control data for voxel characters;

storing geometric data for said voxel characters;

producing a sprite of said voxel characters from said control data and said geometric data and outputting pixel data for each pixel of said sprite;

storing depth data for each pixel of said sprite;

comparing depth data of said sprite and depth data of said background;

outputting a control signal according to said comparing step; and synthesizing said pixel data of said background and said sprite in accordance with said control signal.

24. A method as claimed in claim 23, further comprising rotating said sprite in any one of three dimensions.

* * * * *